United States Patent [19]

Solomon

[11] Patent Number: 5,232,591
[45] Date of Patent: Aug. 3, 1993

[54] STORAGE TANK AND REVERSE OSMOSIS SYSTEM UTILIZING THE SAME

[76] Inventor: Donald F. Solomon, 45640 Denizen Heights Rd., Hemet, Calif. 92544

[21] Appl. No.: 998,800

[22] Filed: Dec. 30, 1992

[51] Int. Cl.⁵ .............................................. B01D 61/08
[52] U.S. Cl. ............................. 210/257.2; 210/321.72
[58] Field of Search ........ 210/634, 642, 644, 649–652, 210/195.2, 257.2, 321.6, 321.72

[56] References Cited

U.S. PATENT DOCUMENTS 3,831,757 8/1974 Gossett et al. .
4,552,656 11/1985 Solomon .

Primary Examiner—Frank Sever
Attorney, Agent, or Firm—Gordon L. Peterson

[57] ABSTRACT

A storage tank comprising a container having an interior space and a pressure responsive wall defining a fluid storage chamber. The pressure responsive wall is displaceable as fluid is supplied to the storage chamber to increase the volume of the storage chamber. The storage tank also includes a variable volume chamber and movement of the pressure responsive wall to increase the volume of the storage chamber reduces the volume of the variable volume container. A compressible medium under pressure is provided in the variable volume container and the change in volume of the fluid storage chamber for a given displacement of the pressure responsive wall is greater than the change in volume of the variable volume container.

9 Claims, 2 Drawing Sheets

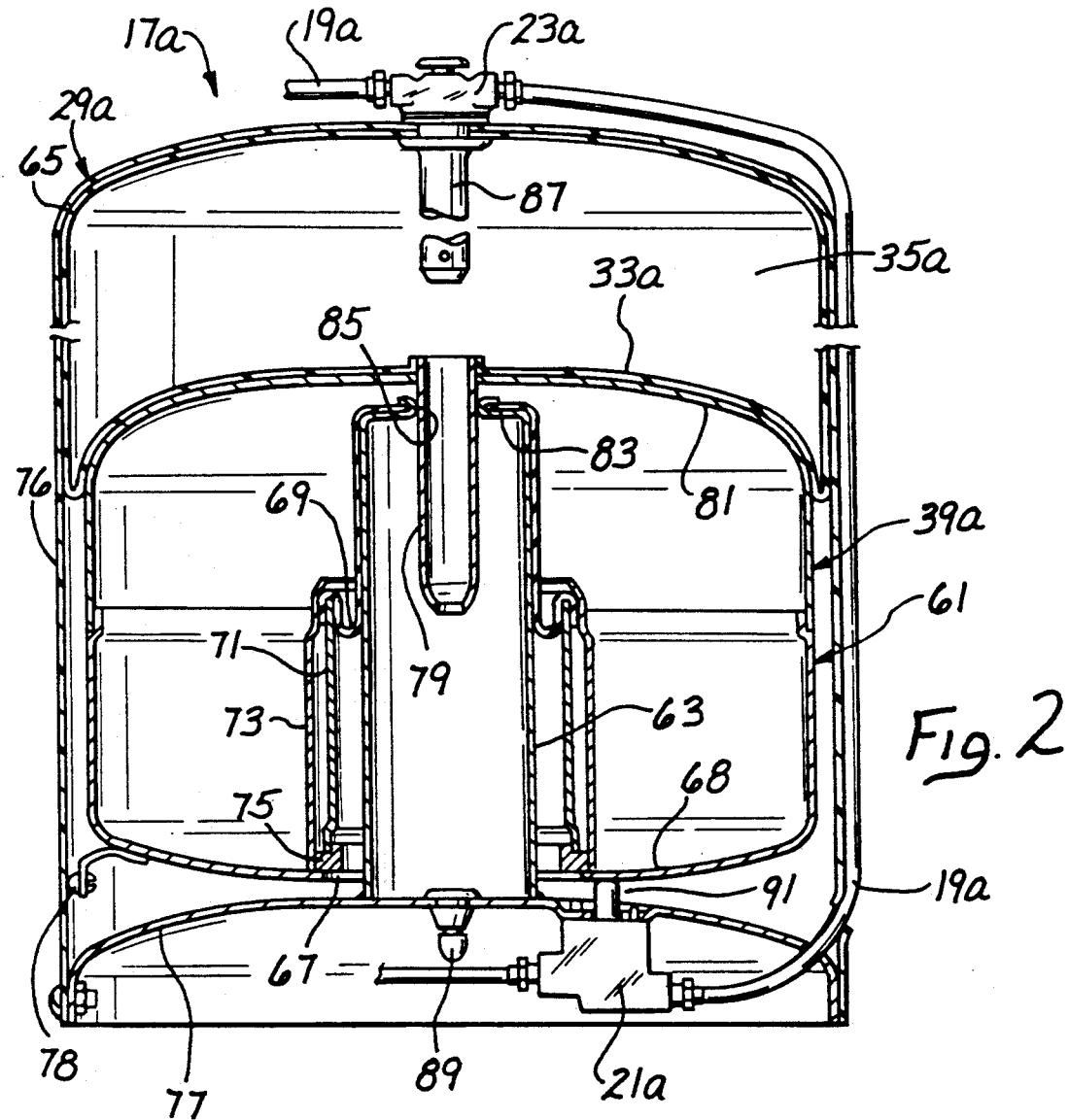
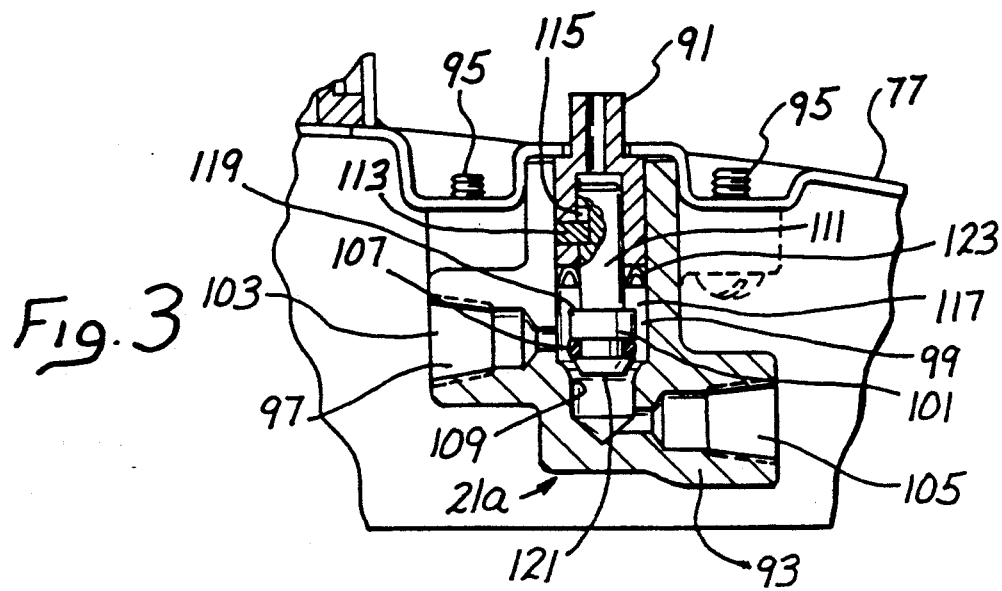

STORAGE TANK AND REVERSE OSMOSIS SYSTEM UTILIZING THE SAME

BACKGROUND OF THE INVENTION

It is sometimes necessary or desirable to store fluid under pressure in a storage tank under conditions in which the pressure of the fluid in the tank does not increase substantially as more fluid is supplied to the tank. One example is in a reverse osmosis system which includes a reverse osmosis filter and a storage tank. In such a system, the reverse osmosis filter provides filtered product water to the storage tank.

In order for a reverse osmosis filter to work efficiently, at least a predetermined pressure drop across the filter must be maintained. If the pressure in the storage tank increases significantly as product water is supplied to it, the differential pressure across the filter reduces, and if the differential pressure falls below a predetermined limit, the efficiency of the reverse osmosis filter in producing product water deteriorates.

The purified water storage system disclosed in my U.S. Pat. No. 4,552,656 addresses this problem by providing a flexible container for product water and using pressurized air outside of the flexible container to pressurize the container. In Gossett et al U.S. Pat. No. 3,831,757 a large and small piston are employed with the small piston resisting movement of the large piston. The small piston is urged to oppose the large piston movement by virtue of feedwater under pressure acting against the small piston. However, the pressure of the feedwater may vary thereby providing a less predictable force to resist movement of the large piston. Also, with low line or feedwater pressure, there may be insufficient force to lift the product water out of the unit.

SUMMARY OF THE INVENTION

This invention provides a storage tank having a storage chamber for receiving fluid and storing the fluid under pressure which eliminates the problems identified above and which provides other advantages. Although the storage tank is particularly adapted for use in a reverse osmosis system to receive product water, it may be used in other systems to receive other fluids, preferably incompressible fluids.

The storage tank includes a container having an interior space and a pressure responsive wall defining a fluid storage chamber. The fluid storage chamber has an inlet through which fluid can be supplied to the storage chamber and an outlet through which fluid can be discharged from the storage chamber. The pressure responsive wall is displaceable as fluid is supplied to the storage chamber to increase the volume of the storage chamber. The pressure within the storage chamber does not increase a great deal as the storage tank is filled. Consequently, the pressure drop across the reverse osmosis filter does not significantly decrease as the storage chamber fills and the reverse osmosis filter can function efficiently regardless of the level of product water in the storage chamber.

The storage tank also includes a variable volume container for resisting movement of the pressure responsive wall in a direction to increase the volume of the storage chamber. Movement of the pressure responsive wall to increase the volume of the storage chamber reduces the volume of the variable volume container. The change in volume of the fluid storage chamber for a given displacement of the pressure responsive wall is greater than the change in volume of the variable volume container.

Unlike the Gossett et al construction referred to above, this invention utilizes a compressible medium under pressure, such as air, in the variable volume container to resist reduction in the volume of the variable volume container. This eliminates the variations caused by line or feedwater pressure variations in the Gossett et al system and assures there will always be adequate pressure to discharge the fluid from the fluid storage chamber.

Various different constructions are possible to assure that a change in volume of the fluid storage chamber for a given displacement of the pressure responsive wall is greater than the change in volume of the variable volume container. For example, the variable volume container may include first and second chamber sections which decrease and increase in volume, respectively, as the pressure responsive wall moves to increase the volume of the fluid storage chamber. Alternatively, the variable volume container may include a compressible medium container having the compressible medium therein and a volume reducing member that is forced into the compressible medium container to reduce the volume of the compressible medium container as the pressure responsive wall moves to increase the volume of the fluid storage chamber.

More particularly, in this latter form of the invention, the compressible medium container preferably has an opening and the volume reducing member is extendible through the opening variable amounts to vary the volume of the compressible medium container. In this event, the pressure responsive wall preferably includes a diaphragm arranged to drive the compressible medium container to force the volume reducing member into the compressible medium container to reduce the volume thereof. A rolling diaphragm is desirably provided as a seal between the compressible medium container and the volume reducing member.

There are several reasons why the pressure within the storage chamber does not increase a great deal as the storage chamber is filled. First, the pressure of the compressible medium in the variable volume container increases less for a given displacement of the pressure responsive wall than in a conventional system. Consequently, there is a correspondingly reduced pressure in the storage chamber which contains the product water. In addition, the area of the pressure responsive wall in the storage chamber is larger than the net area of the pressure responsive wall in the variable volume container which resists displacement of the pressure responsive wall in a direction to reduce the volume of the variable volume container. Consequently, displacement of the pressure responsive wall can be brought about with a lower force per unit area, i.e. psi. Finally, by positioning the pressure responsive wall so that it is at the bottom of the storage chamber, the weight of the water can be used to assist in displacing the pressure responsive wall in response to additional water being provided to the storage chamber. This further reduces the pressure in the storage chamber. The combination of these three factors provides a relatively small pressure increase in the storage chamber as the storage chamber is filled with product water.

Various techniques may be used to guide movement of the variable volume container. For example, a guide may be provided on the variable volume container which is receivable in the volume reducing member. Alternatively, or in addition thereto, the guide may be in the form of a first telescoping member. In this event, a second telescoping member may be provided in the fluid storage chamber which is cooperable with the first telescoping member to guide movement of the variable volume container.

Because the pressure within the fluid storage chamber does not change significantly with variations in the volume of fluid within the storage chamber, pressure change within the storage chamber cannot be conveniently used to shut off the supply of fluid under pressure to the storage tank. Accordingly, this invention preferably provides a shutoff valve and a conduit leading from the shutoff valve toward the inlet. The shutoff valve has a valve element moveable between an open position in which the valve allows the flow of fluid through the valve to the conduit and a closed position in which the valve blocks the flow of fluid through the valve to the conduit. The valve has an actuator drivable by the pressure responsive wall as the fluid in the fluid storage chamber reaches a predetermined level to drive the valve element toward the closed position. Preferably, the valve has pressure responsive surfaces responsive to fluid in the valve to complete movement of the valve element to the closed position to drive the valve element toward the closed position.

A manually operable valve is preferably provided for opening and closing the inlet and the outlet of the fluid storage chamber. In a preferred construction, the valve has a passage which defines both the inlet and the outlet and the valve is in the form of a manually operable spool valve which opens and closes the passage in the valve.

The reverse osmosis system of this invention includes a reverse osmosis filter connectable to a source of feedwater under pressure for providing filtered product water. The product water is supplied to the inlet of the fluid storage chamber.

The invention, together with additional features and advantages thereof may best be understood by reference to the following description taken in connection with the accompanying illustrative drawings.

BRIEF DESCRIPTION OF THE DRAWINGS

FIG. 2 is an axial sectional view illustrating a second preferred form of storage tank.

FIG. 3 is an enlarged fragmentary sectional view illustrating a preferred shutoff valve.

DESCRIPTION OF THE PREFERRED EMBODIMENTS

Figure 1:
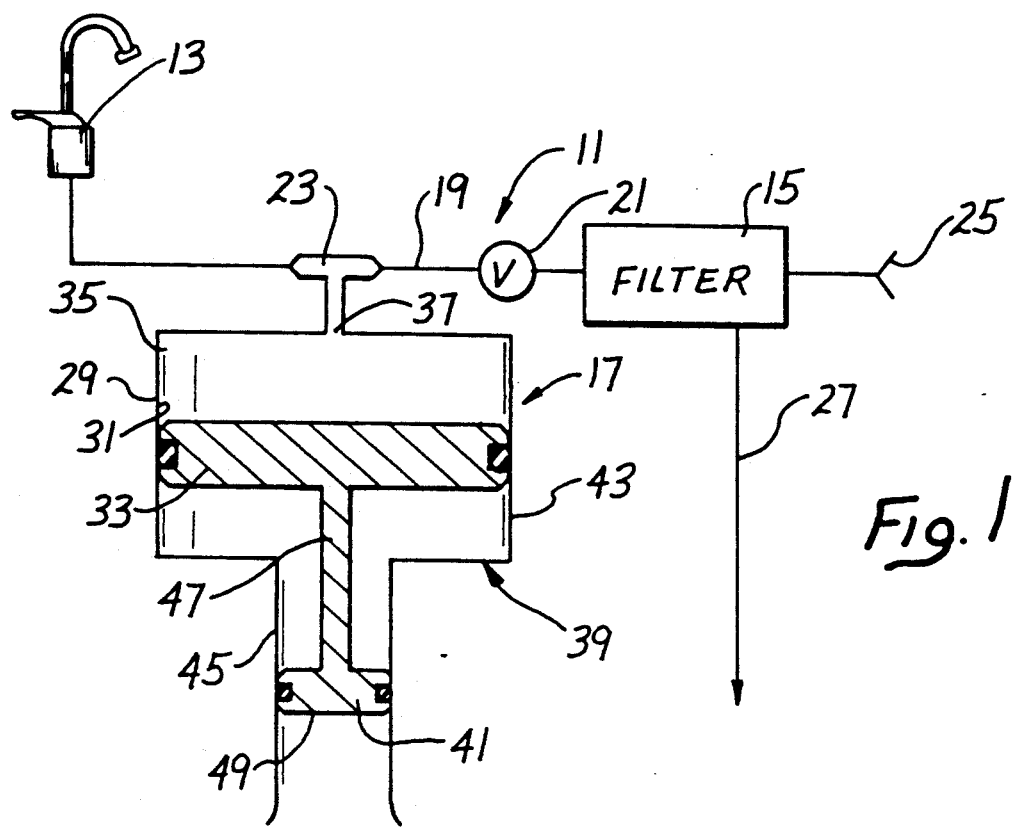
FIG. 1 is a schematic view illustrating one form of reverse osmosis system constructed in accordance with the teachings of this invention. The reverse osmosis system is coupled to a water tap.

FIG. 1 shows a reverse osmosis system 11 coupled to a conventional water tap 13. The reverse osmosis system 11 includes a conventional reverse osmosis filter 15, a storage tank 17, a conduit 19 for supplying filtered product water from the filter 15 to the storage tank 17, a shutoff valve 21 and a manual valve 23. The reverse osmosis filter 15 is connectable to a source 25 of feedwater under pressure and it discharges filtered product water into the conduit 19 and brine into a brine conduit 27 in a known manner.

In the form shown in FIG. 1, the storage tank 17 includes a container 29 having an interior space 31 and a pressure responsive wall 33 in the form of a piston. The container 29 cooperates with the pressure responsive wall 33 to define a storage chamber 35. The storage chamber 35 has an opening 37 which defines a common inlet and outlet for the storage chamber. The opening 37 is in communication with the conduit 19 via the manual valve 23. The pressure responsive wall 33 is displaceable as product water is supplied to the storage chamber 35 to increase the volume of the storage chamber.

The storage tank 17 also includes a variable volume container 39. Although the variable volume container 39 can be constructed in different ways, in the form shown in FIG. 1 it is formed by the pressure responsive wall 33, a piston 41 and a portion of the container 29. More specifically, the container 29 has a large diameter section 43 and a relatively small diameter section 45 and the wall 33 and the piston 41 are slidable in the sections 43 and 45, respectively. The piston 41 is coupled to the pressure responsive wall 33 by a rod 47 and the wall 33 and the piston 41 sealingly engage and slide along the large and small diameter sections 43 and 45, respectively. The piston 41 has an outer or lower face 49 which is open to atmosphere and therefore cannot resist downward movement of the wall 33.

With this arrangement, movement of the pressure responsive wall 33 in a direction to increase the volume of the storage chamber 35 reduces the volume of the variable volume container 39. Thus, downward movement of the pressure responsive wall 33 decreases the volume of the larger diameter section 43 of the variable volume chamber and increases the volume of the smaller diameter section 45 of the variable volume container 39. Consequently, the change in volume of the storage chamber 35 for a given displacement of the pressure responsive wall 33 is greater than the change in volume of the variable volume container 39.

A compressible medium under pressure, such as air, is provided in the variable volume container 39 to resist reduction in volume of the variable volume container. For example, the air in the variable volume chamber 39 may be at about 35 psi and the pressure of the product water in the storage chamber 35 may be about 5 psi when the storage chamber 35 is nearly empty and the pressure responsive wall 33 is at the top (as viewed in FIG. 1) of its stroke. Because the volume of the small diameter section 45 of the variable volume container 39 is increasing as product water fills the storage chamber 35, the pressure of the compressed gas in the variable volume container 39 does not increase as much as if the small diameter section 45 and the piston 41 were not employed. The actual increase in air pressure within the variable volume container 39 is a function of the ratio of the diameters between the sections 43 and 45, and this can be varied as desired. For example, the pressure in the variable volume container 39 may be about 50 psi and the pressure of the product water in the storage chamber 35 may be about 8 psi when the storage chamber is full of product water.

It should be noted that the product water in the storage chamber 35 acts over the full area of the pressure responsive wall 33. By way of contrast, the effective area of the wall 33 resisting downward movement of the wall is the area of the wall 33 less the area of the outer face 49 of the piston 41.

Also the wall 33 and the piston 41 are positioned for generally vertical movement such that the wall 33 supports the weight of the product water in the storage chamber 35. These latter two factors also contribute to minimizing the pressure increase in the storage chamber 35 as the storage chamber 35 is filled with product water from the filter 15.

The shutoff valve 21 may be of any kind which will close in response to the storage chamber 35 being full or having a maximum operational volume of product water therein. The valve 21 should open when the water in the storage chamber 35 drops below a predetermined level. A preferred form of valve 21 is shown in FIG. 3 and is described in connection with the embodiment of FIG. 2.

Figure 4:
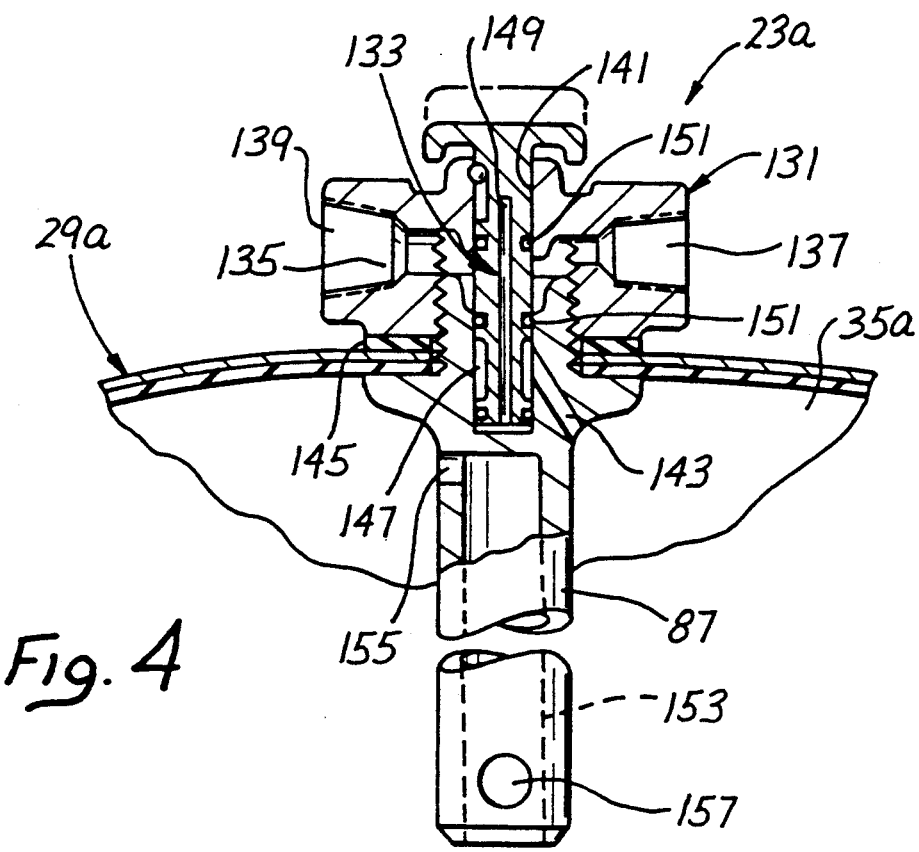
FIG. 4 is an enlarged fragmentary sectional view illustrating a preferred manual valve.

The manual valve 23 may be of various different constructions, and a preferred form is shown in FIG. 4. This valve is also described more fully in connection with the embodiment of FIG. 2. The manual shutoff valve 23 should be capable of permitting a user to manually open and close the opening 37. With the manual valve 23 and the shutoff valve 21 open, there is a pressure drop across the reverse osmosis filter 15 as a result of the relatively high feedwater pressure at the source 25 and a relatively low pressure in the storage chamber 35. Consequently, the reverse osmosis filter 15 provides filtered product water through the conduit 19 to the storage chamber 35. This forces the pressure responsive wall 33 and the piston 41 downwardly, and because the volume of the variable volume container 39 does not reduce as much as if the section 45 were not provided, the pressure in the storage chamber 35 does not increase substantially as the storage chamber 35 fills. Product water can therefore be produced at a relatively high rate and with good purity throughout the full range of motion of the pressure responsive wall 33. When the storage chamber 35 reaches a maximum operational volume, the valve 21 automatically closes to stop operation of the reverse osmosis filter 15. When product water is desired, the tap 13 is opened and the pressure of the compressed air in the variable volume container forces the pressure responsive wall 33 upwardly to force product water from the storage chamber 35 through the opening 37, the manual valve 23 and the conduit 19 to the tap 13.

FIG. 2 shows another form of storage tank 17a together with a shutoff valve 21a, a conduit 19a and a manual valve 23a which may, if desired, be considered as part of the storage tank. Portions of the embodiment of FIG. 2 corresponding to portions of the embodiment of FIG. 1 are designated by corresponding reference numerals followed by the letter a. The storage tank 17a may be coupled into the system 11 of FIG. 1 in the same manner as the storage tank 17 of FIG. 1, and the storage tank 17a may function identically to the storage tank 17 in all respects not shown or described herein.

One difference between the storage tanks 17 and 17a is that the variable volume container 39a includes a compressible medium container 61 and a volume reducing member 63 that can be forced into the compressible medium container to reduce the volume of the compressible medium container as the pressure responsive wall 33a moves to increase the volume of the fluid storage chamber 35a. The compressible medium container 61 and the volume reducing member 63 cooperate to define a variable volume container. FIG. 2 shows the volume reducing member 63 extending a maximum distance into the compressible medium container 61.

More specifically, the container 29a forms a complete enclosure for the storage chamber 35a, the compressible medium container 61 and the volume reducing member 63. A resilient, flexible liner 65 forms a liner for the storage chamber 35a. A lower region of the liner 65 forms a rolling diaphragm and defines the pressure responsive wall 33a.

The compressible medium container 61 may be constructed of a metal, such as steel, or a suitable polymeric material and is movable axially (vertically as shown in FIG. 2) between a lower or storage chamber full position shown in FIG. 2 and an upper or storage chamber empty position. The compressible medium container 61 has an opening 67 in its lower wall 68 through which the volume reducing member 63 can extend variable amounts to vary the volume of the compressible medium container. A rolling diaphragm seal 69 is provided between the compressible medium container 61 and the volume reducing member 63. Specifically, the seal 69 is coupled at one end to the volume reducing member 63 and at the other end to concentric sleeves 71 and 73 which surround the opening 67 and which are mounted on the lower wall 68 of the compressible medium container 61 and project upwardly from the opening 67. For example, the sleeve 73 may be welded to the compressible medium container 61 and the sleeve 71 may be retained by a split snap ring 75.

The container 29a includes a shell 76 of a rigid polymeric material, such as ABS or polyethylene, and a base 77 of a metal such as steel below the compressible medium container 61. The volume reducing member 63, which in this embodiment is in the form of a hollow sleeve, is attached to the base 77 in any suitable manner such as by welding. A plurality of projections 78 (only one being shown in FIG. 2) are suitably attached to the lower wall 68 and are engagable with the shell 76 to guide the vertical movement of the compressible medium container 61.

A tubular guide 79 is coupled to the compressible medium container 61 centrally along an upper wall 81 of the compressible medium container and projects downwardly into the compressible medium container. The guide 79 is receivable in the volume reducing member 63 to guide movement of the compressible medium container. Specifically, the volume reducing member 63 has an end wall 83 with an opening 85 which slidably receives the guide 79 to guide movement of the compressible medium container 61.

The guide 79 is tubular and can receive a stem of the manual valve 23a which projects into the storage chamber 35a when the pressure responsive wall 33a is raised upwardly from the position shown in FIG. 2. Thus, the guide 79 and stem 87 form telescoping members which are cooperable to guide movement of the compressible medium container 61 at least in the upper positions of pressure responsive wall 33a.

The compressible medium container 61 can be filled with air through a conventional air inflation valve 89 which may be similar to the valve used for tire inflation. The air under pressure flows through the volume reducing member 63 and between the end wall 83 and the guide 79 into the compressible medium container 61.

When there is a demand for water, the pressure in the conduit 19a downstream of the manual valve 23a drops and so does the pressure in the storage chamber 35a. The compressed air in the compressible medium container 61 acts along the entire upper wall 81, the guide 79 and along the portion of the lower wall 68 radially outwardly of the sleeve 73. Consequently, there is a net upward force tending to move the compressible medium container 61 and the wall 33 upwardly. This force is sufficient to discharge water from the storage chamber 35a through the manual valve 23a and the conduit 19a to the tap 13 shown in FIG. 1 at adequate pressure. When the tap 13 is closed, pressure in the storage chamber 35a is restored. With the tap closed, water from the filter flows into the storage chamber 35a to force the wall 33a downwardly and the volume reducing member into the compressible medium container 61. This reduces the volume of the container 61 and increases somewhat the pressure of the air in the container. For example, the pressure in the storage chamber 35a may vary from about 5 to 8 psi and the pressure of the compressed air in the compressible medium container 61 may vary from about 35 to about 50 psi. The ratio of the diameters of the compressible medium container 61 and the volume reducing member 63 can be selected as desired by those skilled in the art.

In this embodiment, the shutoff valve 21a is mounted on the base 77 and has a moveable actuator 91 which projects upwardly through the base 77 and can be contacted by the lower wall 68 of the compressible medium container 61. Thus, the actuator 71 is drivable by the pressure responsive wall 33a as the fluid in the fluid storage chamber 35a reaches a predetermined level.

Although the valve 21a can take different forms, FIG. 3 shows a preferred construction for this valve. As shown in FIG. 3, the valve 21a includes a valve body 93 suitably attached as by screws 95 to the base 77. The valve body 93 has a flow passage 97 extending through it and a bore 99 extending transversely to the flow passage 97. A valve element 101 is movably in the bore 99 and the flow passage 97 between an open position shown in FIG. 3 in which the valve element allows the flow of product water through the flow passage 97 from an inlet 103 to an outlet 105 and closed position in which an annular seal 107 of the valve element is received in and forms a seal with a cylindrical passage section 109.

The actuator 91 is slidable in the bore 99 and projects upwardly out of the valve body 93 and through an opening in the base 77 so it can be engaged by the lower wall 68 of the compressible medium container 61. The actuator 91 is tubular and slidably receives a stem 111 of the valve element 101. The actuator 91 is keyed to the stem 101 with a key 113 which lies in an axially extending groove 115 in the stem 111. The arrangement is such that when the compressible medium container 61 engages the actuator 91 and forces the actuator downwardly as viewed in FIGS. 2 and 3 the key 113 engages the lower end of the slot 115 to drive the valve element 101 downwardly toward the closed position. As the lower end of the valve element 101 enters the passage section 109, the pressure drop across the valve element 101 increases flow significantly such that the pressure in the passage section 109 is much less than the pressure in a chamber 117. This pressure differential is sufficient to move the valve element 101 sufficiently into the passage section 109 to seal off the flow passage 97 and thereby define the closed position. Specifically, the valve element 101 has pressure responsive surfaces 119 and 121 against which the pressure acts to bring about valve closure. Because the slot 115 is longer than the key 113, the valve element 101 can move relative to the actuator 91 to provide this closing movement.

As water is used and taken from the storage chamber 35a, the compressible medium container 61 rises and eventually lifts off the actuator 91. Water under pressure from the inlet 103 then acts against a seal 123 below the actuator 91 to lift the actuator. Specifically, the actuator 91 is moved until it strikes the upper end of the groove 115 and thereafter it drives the valve element 101 upwardly to move the valve element to the open position in which the flow passage 97 is open. In this manner, the seal 123 defines a pressure responsive surface responsive to fluid in the valve 21a to move the valve element 101 to the open position.

A preferred form of the manual valve 23a is shown in FIG. 4. The valve 23a includes a valve body 131, a spool 133 and the stem 87. The valve body 131 has a flow passage 135 with an inlet 137 and an outlet 139 which can be connected to the conduit 19a and a bore 141 intersecting the flow passage 135 and transverse to the flow passage. The bore 141 also extends into the upper region of the stem 87 and a passage 143 extends from the bore 141 to the storage chamber 35a.

In this embodiment, the stem 87 is attached with screw threads to the valve body 131. Regions of the container 29a are clamped between the stem 87 and the valve body 131 to mount the manual valve 23a on the container 29a, and an annular seal 145 may seal the interface between the valve body and the container 29a.

The spool 133 is balanced and remains in the position in which it is placed. The spool 133 has an annular groove 147 and a passage 149 extending axially through the spool.

The spool 133 is slidable in the bore 141 between a closed position shown in FIG. 1 in which the spool closes or blocks the flow passage 135 and an open position in which the spool 133 is elevated from the position shown in FIG. 4 so that the annular groove 147 provides communication between the inlet 137 and the outlet 139 and between the flow passage 135 and the passage 143. In the open position, water can flow through the conduit 19a from the inlet 137 to the outlet 139 and between the storage chamber 35a and the flow passage 135 via the passage 143 and the annular groove 147. The valve 23a is normally in the open position.

The spool 133 is manually movable between the open and closed positions and for that purpose projects upwardly out of the valve body 131 as shown in FIG. 4. Annular seals 151 are provided on the spool 133 above the groove 147 as desired to seal the interface between the spool and the bore 141. The bore 141 is a blind bore and the passage 149 prevents entrapment of air between the blind end of the bore and the confronting end of the spool 133.

In the illustrated embodiment the stem 87, which cooperates with the guide 79 as discussed above, has a lower passage 153 which opens at the lower end of the stem and openings 155 and 157 adjacent the upper and lower ends of the stem. The guide 79 will contain product water and forms a reasonably close sliding fit with the stem 87. The lower passage 153 together with the openings 155 and 157 prevent the water in the guide 79 from being wholly or partially trapped to retard movement of the pressure responsive wall 33.

Although exemplary embodiments of the invention have been shown and described, many changes, modifications and substitutions may be made by one having ordinary skill in the art without necessarily departing from the spirit and scope of this invention.

I claim:

1. A reverse osmosis system comprising:

a reverse osmosis filter connectable to a source of feedwater under pressure and for providing filtered product water;

a container having an interior space and a pressure responsive wall defining a fluid storage chamber, said fluid storage chamber having an inlet;

a conduit for supplying filtered product water from the reverse osmosis filter to the inlet whereby the filtered product water can be supplied to the storage chamber, the fluid storage chamber having an outlet through which filtered product water can be discharged from the storage chamber;

said pressure responsive wall being displaceable as filtered product water is supplied to the storage chamber to increase the volume of the storage chamber;

a variable volume container, movement of the pressure responsive wall to increase the volume of the storage chamber reducing the volume of the variable volume container;

a compressible medium under pressure in the variable volume container to resist reduction in the volume of the variable volume container; and the change in volume of the fluid storage chamber for a given displacement of the pressure responsive wall being sufficiently greater than the change in volume of the variable volume container so that the tendency of the pressure in the fluid storage chamber to increase, as the fluid storage chamber is supplied with filtered product water, is reduced.

2. A system as defined in claim 1 wherein the variable volume container includes first and second chamber sections which decrease and increase in volume, respectively, as the pressure responsive wall moves to increase the volume of the fluid storage chamber.

3. A system as defined in claim 1 wherein the variable volume container includes a compressible medium container having the compressible medium therein and a volume reducing member that is forced into the compressible medium container to reduce the volume of the compressible medium container as the pressure responsive wall moves to increase the volume of the fluid storage chamber.

4. A system as defined in claim 1 including a shutoff valve in the conduit between the reverse osmosis filter and the inlet, said shutoff valve having a valve element movable between an open position in which the valve allows the flow of the filtered product water through the valve to the inlet and a closed position in which the valve blocks the flow of filtered product water through the valve to the inlet, said valve having an actuator drivable by the pressure responsive wall as the filtered product water in the fluid storage chamber reaches a predetermined level to drive the valve element toward the closed position.

5. A reverse osmosis system comprising:

a reverse osmosis filter connectable to a source of feedwater under pressure and for providing filtered product water;

a container having an interior space and a pressure responsive wall defining a fluid storage chamber, said fluid storage chamber having an inlet;

a conduit for supplying filtered product water from the reverse osmosis filter to the inlet whereby the filtered product water can be supplied to the storage chamber, the fluid storage chamber having an outlet through which filtered product water can be discharged from the storage chamber;

said pressure responsive wall being displaceable as filtered product water is supplied to the storage chamber to increase the volume of the storage chamber;

a compressible medium container;

a compressible medium under pressure in the compressible medium container; and a volume reducing member, movement of the pressure responsive wall to increase the volume of the storage chamber forcing the volume reducing member into the compressible medium container to reduce the volume of the compressible medium container and to resist movement of the pressure responsive wall in a direction to increase the volume of the storage chamber so that the tendency of the pressure in the fluid storage chamber to increase, as the fluid storage chamber is supplied with filtered product water, is reduced.

6. A system as defined in claim 5 wherein the compressible medium container has an opening and the volume reducing member is extendible through the opening variable amounts to vary the volume of the compressible medium container and the pressure responsive wall includes a diaphragm arranged to drive the compressible medium container to force the volume reducing member into the compressible medium container to reduce the volume thereof.

7. A system as defined in claim 6 including a rolling diaphragm seal between the compressible medium container and the volume reducing member.

8. A system as defined in claim 5 including a guide on the variable volume container receivable in the volume reducing member to guide movement of the variable volume container.

9. A system as defined in claim 8 wherein the guide is a first telescoping member and including a second telescoping member in the fluid storage chamber cooperable with the first telescoping member to guide movement of the variable volume container.

* * * * *